US012666488B2

(12) United States Patent (10) Patent No.: US 12,666,488 B2
Matsumura et al. (45) Date of Patent: Jun. 23, 2026

(54) TERMINAL, RADIO COMMUNICATION METHOD, BASE STATION, AND SYSTEM FOR BEAM FAILURE DETECTION

(71) Applicant: NTT DOCOMO, INC., Tokyo (JP)

(72) Inventors: Yuki Matsumura, Tokyo (JP); Satoshi Nagata, Tokyo (JP); Weiqi Sun, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 311 days.

(21) Appl. No.: 18/271,145

(22) PCT Filed: Jan. 8, 2021

(86) PCT No.: PCT/JP2021/000548
§ 371 (c)(1),
(2) Date: Jul. 6, 2023

(87) PCT Pub. No.: WO2022/149275
PCT Pub. Date: Jul. 14, 2022

(65) Prior Publication Data
US 2024/0090067 A1      Mar. 14, 2024

(51) Int. Cl.
*H04W 76/20* (2018.01)
*H04L 5/00* (2006.01)
(Continued)

(52) U.S. Cl.
CPC ........... *H04W 76/20* (2018.02); *H04L 5/0051* (2013.01); *H04W 24/00* (2013.01); *H04W 80/02* (2013.01)

(58) Field of Classification Search
CPC ... H04L 5/0048; H04L 5/0051; H04L 5/0053; H04W 24/00; H04W 24/04; H04W 76/20; H04W 80/02
See application file for complete search history.

(56) References Cited

U.S. PATENT DOCUMENTS

2019/0379506 A1    12/2019  Cheng
2020/0007678 A1     1/2020  Zhou et al.
(Continued)

FOREIGN PATENT DOCUMENTS

WO      2020/059140 A1    3/2020
WO      2020/144871 A1    7/2020
(Continued)

OTHER PUBLICATIONS

Office Action issued in Japanese Patent Application No. 2022-573889, mailed on Oct. 29, 2024 (6 pages).
(Continued)

*Primary Examiner* — Pao Sinkantarakorn
(74) *Attorney, Agent, or Firm* — Osha Bergman Watanabe & Burton LLP

(57) ABSTRACT
A terminal according to one aspect of the present disclosure includes a receiving section that receives a medium access control-control element (MAC CE) indicating two active transmission configuration indicator (TCI) states for one control resource set, and a control section that, when an information element of a radio link monitoring (RLM) reference signal is not provided, uses a reference signal in at least one TCI state out of the two active TCI states for RLM. According to one aspect of the present disclosure, it is possible to appropriately perform at least one of RLM and BFD.

5 Claims, 9 Drawing Sheets

(51) Int. Cl.
  *H04W 24/00*    (2009.01)
  *H04W 80/02*    (2009.01)

(56)           References Cited

U.S. PATENT DOCUMENTS

| | | | |
|---|---|---|---|
| 2021/0351975 A1 | 11/2021 | Matsumura et al. | |
| 2022/0103288 A1 | 3/2022 | Matsumura et al. | |
| 2022/0167378 A1 | 5/2022 | Matsumura et al. | |
| 2022/0209918 A1 | 6/2022 | Matsumura et al. | |
| 2022/0231810 A1 | 7/2022 | Matsumura et al. | |
| 2022/0239437 A1 | 7/2022 | Matsumura et al. | |
| 2022/0311577 A1 | 9/2022 | Matsumura et al. | |
| 2023/0080763 A1* | 3/2023 | Nam | H04L 5/0048 |
| | | | 370/252 |
| 2023/0164865 A1* | 5/2023 | Kang | H04B 7/06968 |
| | | | 370/329 |
| 2023/0180033 A1* | 6/2023 | Cirik | H04B 7/088 |
| 2023/0239852 A1* | 7/2023 | Oteri | H04B 7/063 |
| | | | 370/329 |
| 2024/0014880 A1* | 1/2024 | Svedman | H04B 7/06968 |
| 2024/0098531 A1* | 3/2024 | Gao | H04B 7/06956 |

FOREIGN PATENT DOCUMENTS

| | | |
|---|---|---|
| WO | 2020/209282 A1 | 10/2020 |
| WO | 2020/230243 A1 | 11/2020 |
| WO | 2020/240863 A1 | 12/2020 |
| WO | 2020/246013 A1 | 12/2020 |
| WO | 2020/246014 A1 | 12/2020 |

OTHER PUBLICATIONS

International Search Report issued in PCT/JP2021/000548 on Jul. 13, 2021 (1 page).

Written Opinion of the International Searching Authority issued in PCT/JP2021/000548 on Jul. 13, 2021 (3 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner $N_{LR-RLM}$ and $N_{RLM}$ as a function of maximum number $L_{max}$ of SS/PBCH blocks per half frame

| $L_{max}$ | $N_{LR-RLM}$ | $N_{RLM}$ |
|-----------|--------------|-----------|
| 4 | 2 | 2 |
| 8 | 6 | 4 |
| 64 | 8 | 8 |

FIG. 1

BOTH ARE USED FOR RLM

FIRST TCI STATE IS USED FOR RLM

LOWEST TCI STATE ID IS USED FOR RLM

BOTH ARE USED FOR BFD

FIRST TCI STATE IS USED FOR BFD

LOWEST TCI STATE ID IS USED FOR BFD

TERMINAL, RADIO COMMUNICATION METHOD, BASE STATION, AND SYSTEM FOR BEAM FAILURE DETECTION

TECHNICAL FIELD

The present disclosure relates to a terminal, a radio communication method, and a base station in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (for example, also referred to as "5th generation mobile communication system (5G)," "5G+ (plus)," "6th generation mobile communication system (6G)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In NR, a terminal performs radio link failure (radio link monitoring (RLM))/beam failure detection (BFD).

However, when a configuration/information element of a reference signal (RS) for the RLM/BFD is not provided, how to perform the RLM/BFD is indefinite. Unless the RLM/BFD is appropriately performed, throughput reduction or communication quality degradation may occur.

Thus, an object of the present disclosure is to provide a terminal, a radio communication method, and a base station that appropriately perform at least one of RLM and BFD.

Solution to Problem

A terminal according to one aspect of the present disclosure includes a receiving section that receives a medium access control-control element (MAC CE) indicating two active transmission configuration indicator (TCI) states for one control resource set, and a control section that, when an information element of a radio link monitoring (RLM) reference signal is not provided, uses a reference signal in at least one TCI state out of the two active TCI states for RLM.

Advantageous Effects of Invention

According to one aspect of the present disclosure, it is possible to appropriately perform at least one of RLM and BFD.

BRIEF DESCRIPTION OF DRAWINGS

FIG. 1 is a diagram to show an example of the number of RLM-RSs.

Figure 2:
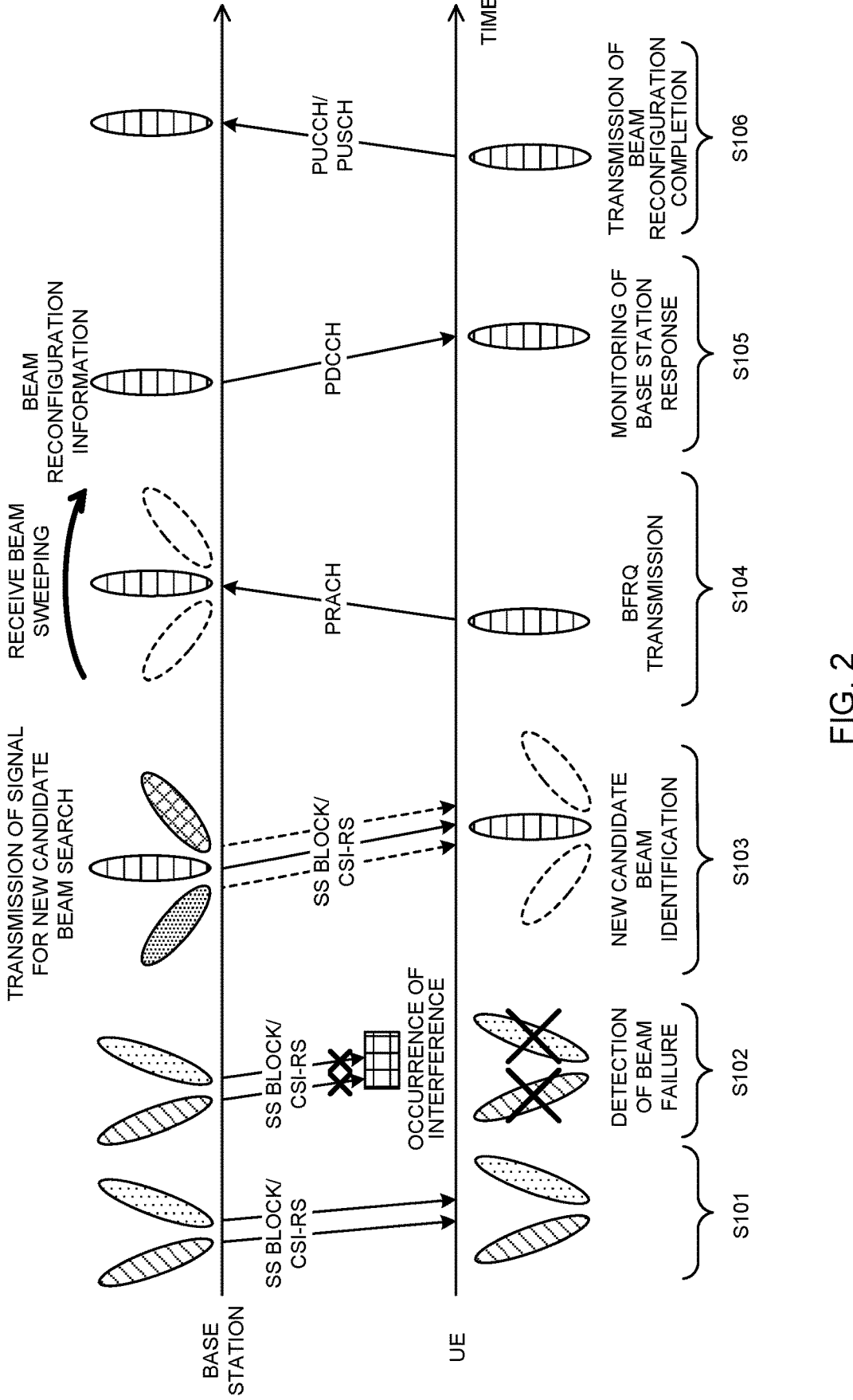
FIG. 2 is a diagram to show an example of beam recovery procedure.

DESCRIPTION OF EMBODIMENTS (TCI, Spatial Relation, QCL)

For NR, control of reception processing (for example, at least one of reception, demapping, demodulation, and decoding) and transmission processing (for example, at least one of transmission, mapping, precoding, modulation, and coding) in a UE regarding at least one of a signal and a channel (which is expressed as a signal/channel) based on a transmission configuration indication state (TCI state) is under study.

The TCI state may be a state applied to a downlink signal/channel. A state that corresponds to the TCI state applied to an uplink signal/channel may be expressed as spatial relation.

The TCI state is information related to quasi-co-location (QCL) of the signal/channel, and may be referred to as a spatial reception parameter, spatial relation information, or the like. The TCI state may be configured for the UE for each channel or for each signal.

QCL is an indicator indicating statistical properties of the signal/channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) (which may be referred to as QCL parameter (s)) are described below:

QCL type A (QCL-A): Doppler shift, Doppler spread, average delay, and delay spread QCL type B (QCL-B): Doppler shift and Doppler spread QCL type C (QCL-C): Doppler shift and average delay QCL type D (QCL-D): Spatial reception parameter A case that the UE assumes that a certain control resource set (CORESET), channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or the QCL assumption of the signal/channel.

The TCI state may be, for example, information related to QCL between a channel as a target (in other words, a reference signal (RS) for the channel) and another signal (for example, another RS). The TCI state may be configured (indicated) by higher layer signaling or physical layer signaling, or a combination of these.

The physical layer signaling may be, for example, downlink control information (DCI).

A channel for which the TCI state or spatial relation is configured (specified) may be, for example, at least one of a downlink shared channel (Physical Downlink Shared Channel (PDSCH)), a downlink control channel (Physical Downlink Control Channel (PDCCH)), an uplink shared channel (Physical Uplink Shared Channel (PUSCH)), and an uplink control channel (Physical Uplink Control Channel (PUCCH)).

The RS to have a QCL relationship with the channel may be, for example, at least one of a synchronization signal block (SSB), a channel state information reference signal (CSI-RS), a reference signal for measurement (Sounding Reference Signal (SRS)), a CSI-RS for tracking (also referred to as a Tracking Reference Signal (TRS)), and a reference signal for QCL detection (also referred to as a QRS).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An RS of QCL type X in a TCI state may mean an RS to have a relationship of QCL type X with (a DMRS for) a certain channel/signal, and this RS may be referred to as a QCL source of QCL type X in the TCI state.

For the PDCCH and the PDSCH, a QCL type A RS may always be configured, and a QCL type D RS may be configured additionally. It is difficult to estimate a Doppler shift, a delay, and the like by using DMRS one-shot reception, and thus the QCL type A RS is used for improvement in channel estimation accuracy. The QCL type D RS is used for receive beam determination in DMRS reception.

For example, TRS 1-1, TRS 1-2, TRS 1-3, and TRS 1-4 are transmitted, and TRS 1-1 is notified as a QCL type C/D RS by a TCI state for the PDSCH. The TCI state is notified, thereby allowing the UE to use, for reception of a DMRS for the PDSCH/channel estimation, information obtained from a result of past periodic reception/measurement of TRS 1-1. In this case, a QCL source for the PDSCH is TRS 1-1, and a QCL target is the DMRS for the PDSCH.

(Multi-TRP)

For NR, one or a plurality of transmission/reception points (TRPs) (multiple TRPs (multi TRP (MTRP))) that perform DL transmission to a UE by using one or a plurality of panels (multi panel) are under study. The UE that performs UL transmission to one or the plurality of TRPs by using one or a plurality of panels is also under study.

Note that the plurality of TRPs may correspond to the same cell identifier (ID), or may correspond to different cell IDs. The cell ID may be a physical cell ID, or may be a virtual cell ID.

The multiple TRPs (for example, TRP #1 and TRP #2) may be connected to each other by an ideal/non-ideal backhaul, and information, data, and the like may be exchanged. From respective TRPs of the multiple TRPs, different codewords (Code Words, CWs) and different layers may be transmitted. As a mode of multi-TRP transmission, non-coherent joint transmission (NCJT) may be used.

In NCJT, for example, TRP #1 performs modulation mapping and layer mapping for a first codeword to transmit a first number of layers (for example, 2 layers) and to transmit a first PDSCH by using first precoding. TRP #2 performs modulation mapping and layer mapping for a second codeword to transmit a second number of layers (for example, 2 layers) and to transmit a second PDSCH by using second precoding.

Note that a plurality of PDSCHs (multiple PDSCHs) transmitted by NCJT may be defined as PDSCHs partially or fully overlapping with each other in relation to at least one of time and frequency domains. In other words, a first PDSCH from a first TRP and a second PDSCH from a second TRP may overlap with each other in at least one of time and frequency resources.

It may be assumed that these first PDSCH and second PDSCH are not in a quasi-co-location (QCL) relationship (not quasi-co-located). Reception of the multiple PDSCHs may be interpreted as simultaneous reception of PDSCHs other than a certain QCL type (for example, QCL type D).

A plurality of PDSCHs (which may be referred to as multiple PDSCHs) from the multiple TRPs may be scheduled by using one piece of DCI (single DCI, single PDCCH) (single master mode, multiple TRPs based on single DCI (single-DCI based multi-TRP)). A respective plurality of PDSCHs from the multiple TRPs may be scheduled by using a plurality of pieces of DCI (a plurality of DCI, multiple DCI, multiple PDCCHs) (multi-master mode, multiple TRPs based on multiple DCI (multi-DCI based multi-TRP)).

For URLLC for multiple TRPs, support for repetition of a PDSCH (transport block (TB) or codeword (CW)) across the multiple TRPs is under study. Support for repetition schemes (URLLC schemes, for example, schemes 1, 2a, 2b, 3, and 4) across the multiple TRPs on a frequency domain, a layer (spatial) domain, or a time domain is under study. In scheme 1, multiple PDSCHs from the multiple TRPs are space division multiplexed (SDMed). In schemes 2a and 2b, PDSCHs from the multiple TRPs are frequency division multiplexed (FDMed). In scheme 2a, redundancy versions (RVs) for the multiple TRPs are the same. In scheme 2b, the RVs for the multiple TRPs may be the same, or may be different from each other. In schemes 3 and 4, multiple PDSCHs from the multiple TRPs are time division multiplexed (TDMed). In scheme 3, the multiple PDSCHs from the multiple TRPs are transmitted in one slot. In scheme 4, the multiple PDSCHs from the multiple TRPs are transmitted in different slots.

According to such a multi-TRP scenario, more flexible transmission control using a channel with satisfactory quality is possible.

In order to support intra-cell (having the same cell ID) and inter-cell (having different cell IDs) multi-TRP transmissions based on multiple PDCCHs, in RRC configuration information for linking a plurality of pairs of PDCCHs and PDSCHs having multiple TRPs, one control resource set (CORESET) in PDCCH configuration information (PDCCH-Config) may correspond to one TRP.

The UE may judge that the multiple TRPs are multiple TRPs based on multiple DCI when at least one of condition 1 and condition 2 below is satisfied. In this case, the TRPs may be interpreted as CORESET pool indices.

[Condition 1]

A CORESET pool index with 1 is configured.

[Condition 2]

Two different values (for example, 0 and 1) of CORESET pool indices are configured.

The UE may judge that the multiple TRPs are multiple TRPs based on single DCI when the following condition is satisfied. In this case, two TRPs may be interpreted as two TCI states indicated by a MAC CE/DCI.

[Condition]

In order to indicate one or two TCI states for one code point of a TCI field in DCI, an "enhanced TCI state activation/deactivation MAC CE for a UE-specific PDSCH (Enhanced TCI states Activation/Deactivation for UE-specific PDSCH MAC CE)" is used.

DCI for common beam indication may be a UE-specific DCI format (for example, DL DCI format (for example, 1_1 or 1_2) or UL DCI format (for example, 0_1 or 0_2)), or may be a UE-group common DCI format.

(Radio Link Monitoring (RLM))

In NR, radio link monitoring (RLM) is used.

In NR, a base station may configure, for the UE, a radio link monitoring reference signal (Radio Link Monitoring RS (RLM-RS)) for each of BWPs by using higher layer signaling. The UE may receive configuration information for RLM (for example, an information element "RadioLinkMonitoringConfig" of RRC).

The configuration information for RLM may include failure detection resource configuration information (for example, a higher layer parameter "failureDetectionResourcesToAddModList"). The failure detection resource configuration information may include a parameter related to the RLM-RS (for example, a higher layer parameter "RadioLinkMonitoringRS").

The parameter related to the RLM-RS may include information indicating that the parameter corresponds to the purpose of RLM, an index corresponding to a resource of the RLM-RS (for example, an index included in a higher layer parameter "failureDetectionResources" (RadioLinkMonitoringRS in failureDetectionResourcesToAddModList)), and the like. For example, the index may be a CSI-RS resource configuration index (for example, a non-zero power CSI-RS resource ID), or may be an SS/PBCH block index (SSB index). The information about the purpose may indicate beam failure, (cell level) Radio Link Failure (RLF), or both of them.

The UE may identify an RLM-RS resource on the basis of the index corresponding to the resource of the RLM-RS, and may perform RLM by using the RLM-RS resource.

In RLM in Rel. 16, the UE follows procedure below.

[Procedure]

If the RLM-RS (RadioLinkMonitoringRS) is not provided for the UE, and a TCI state including one or more CSI-RSs for PDCCH reception is provided for the UE, UE follows procedure 1 to procedure 4 below.

[[Procedure 1]]

If an active TCI state for the PDCCH reception includes only one RS, the UE uses, for RLM, the RS provided for the active TCI state for the PDCCH reception.

[[Procedure 2]]

If the active TCI state for the PDCCH reception includes two RSs, the UE assumes that one RS has QCL type D, and the UE uses, for RLM, the RS having QCL type D. The UE does not assume that both of the RSs have QCL type D.

[[Procedure 3]]

The UE is not required to use an aperiodic or semi-persistent RS for RLM.

[[Procedure 4]]

For $L_{max}=4$, the UE selects, in order starting from the lowest monitoring periodicity, $N_{RLM}$ RSs provided for an active TCI state for PDCCH reception in a plurality of CORESETs associated with a plurality of search space sets. If more than one CORESET is associated with a plurality of search space sets having the same monitoring periodicity, the UE determines a CORESET order starting from the highest CORESET index.

Here, $L_{max}$ is a maximum number of SS/PBCH block indices in a cell. A maximum number of SS/PBCH blocks transmitted in a half-frame is $L_{max}$.

Thus, when the RLM-RS is not provided for the UE, the UE performs implicit RLM-RS determination, and uses, for RLM, an active TCI state for PDCCH reception. When $L_{max}=4$, the UE selects $N_{RLM}$ RSs firstly in ascending order of monitoring periodicities of the search space sets, and subsequently in descending order of CORESET indices. The UE selects a CORESET.

Up to $N_{LR-RLM}$ RLM-RSs for link recovery procedure and RLM can be configured for the UE. Up to $N_{RLM}$ RLM-RSs out of $N_{LR-RLM}$ RLM-RSs are used for the RLM depending on $L_{max}$. In Rel. 16, as shown in FIG. 1, $N_{RLM}=2$ when $L_{max}=4$, $N_{RLM}=4$ when $L_{max}=8$, and $N_{RLM}=8$ when $L_{max}=64$.

(Beam Failure Detection (BFD)/Beam Failure Recovery (BFR))

In NR, communication is performed by using beam forming. For example, a UE and a base station (for example, gNB (gNodeB)) may use a beam used for signal transmission (also referred to as a transmit beam, Tx beam, or the like) and a beam used for signal reception (also referred to as a receive beam, Rx beam, or the like).

Using the beam forming is susceptible to interference from an obstruction, and thus it is assumed that radio link quality deteriorates. Due to deterioration of the radio link quality, radio link failure (RLF) may occur frequently. Occurrence of the RLF requires reconnection of a cell, and thus frequent occurrence of the RLF causes deterioration of system throughput.

In NR, in order to suppress occurrence of the RLF, when quality of a specific beam deteriorates, procedure for switching to another beam (which may be referred to as beam recovery (BR), beam failure recovery (BFR), L1/L2 (Layer 1/Layer 2) beam recovery, or the like) is performed. Note that the BFR procedure may be simply referred to as BFR.

Note that beam failure (BF) in the present disclosure may be referred to as link failure.

FIG. 2 is a diagram to show an example of the beam recovery procedure in Rel-15 NR. The number of beams and the like are just examples, and are not limited to this. In an initial state (step S101), the UE performs measurement based on a reference signal (RS) resource transmitted by using two beams.

The RS may be at least one of a synchronization signal block (SSB) and an RS for channel state measurement (Channel State Information RS (CSI-RS)). Note that the SSB may be referred to as an SS/PBCH (Physical Broadcast Channel) block or the like.

The RS may be at least one of a primary synchronization signal (Primary SS (PSS)), a secondary synchronization signal (Secondary SS (SSS)), a mobility reference signal (Mobility RS (MRS)), a signal included in the SSB, the SSB, the CSI-RS, a demodulation reference signal (DMRS), a beam-specific signal, and the like, or may be a signal constituted by expanding, changing, or the like these signals. The RS measured at step S101 may be referred to as an RS for beam failure detection (Beam Failure Detection RS (BFD-RS)), an RS used for beam recovery procedure (BFR-RS), or the like.

At step S102, due to interference of a radio wave from the base station, the UE fails to detect the BFD-RS (or quality of reception of the RS deteriorates). Such interference may occur due to, for example, influence of an obstruction, fading, interference, and the like between the UE and the base station.

The UE detects beam failure when a certain condition is satisfied. For example, the UE may detect occurrence of the beam failure when a BLER (Block Error Rate) for all of configured BFD-RSs (BFD-RS resource configurations) is less than a threshold value. When occurrence of the beam failure is detected, a lower layer (physical (PHY) layer) of the UE may notify (indicate) a beam failure instance for a higher layer (MAC layer).

Note that judgment standards (criteria) are not limited to the BLER, and may be reference signal received power in the physical layer (Layer 1 Reference Signal Received Power (L1-RSRP)). In place of the RS measurement or in addition to the RS measurement, beam failure detection may be performed on the basis of a downlink control channel (Physical Downlink Control Channel (PDCCH)) or the like. The BFD-RS may be expected to be quasi-co-location (QCL) with a DMRS for a PDCCH monitored by the UE.

Here, QCL is an indicator indicating statistical properties of the channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

Information related to the BFD-RS (for example, indices, resources, numbers, the number of ports, precoding, and the like for the RS), information related to the beam failure detection (BFD) (for example, the above-mentioned threshold value), and the like may be configured (notified) for the UE by using higher layer signaling or the like. The information related to the BFD-RS may be referred to as information related to resources for BFR or the like.

The higher layer (for example, the MAC layer) of the UE may start a certain timer (which may be referred to as a beam failure detection timer) when receiving beam failure instance notification from the PHY layer of the UE. The MAC layer of the UE may trigger BFR (for example, start any one of random access procedures mentioned below) when receiving the beam failure instance notification certain times (for example, beamFailureInstanceMaxCount configured by RRC) or more until the timer expires.

When there is no notification from the UE or when receiving a certain signal (beam recovery request at step S104) from the UE, the base station may judge that the UE has detected beam failure.

At step S103, for beam recovery, the UE starts a search for a new candidate beam for use in new communication. The UE may select, by measuring a certain RS, the new candidate beam corresponding to the RS. The RS measured at step S103 may be referred to as a new candidate RS, an RS for new candidate beam identification (New Candidate Beam Identification RS (NCBI-RS)), a CBI-RS, a CB-RS (Candidate Beam RS), or the like. The NCBI-RS may be the same as the BFD-RS, or may be different from the BFD-RS. Note that the new candidate beam may be simply referred to as a candidate beam or a candidate RS.

The UE may determine a beam corresponding to an RS satisfying a certain condition as the new candidate beam. For example, the UE may determine the new candidate beam on the basis of an RS with L1-RSRP exceeding a threshold value, out of configured NCBI-RSs. Note that judgment standards (criteria) are not limited to the L1-RSRP. The L1-RSRP related to an SSB may be referred to as SS-RSRP. The L1-RSRP related to a CSI-RS may be referred to as CSI-RSRP.

Information related to the NCBI-RS (for example, resources, numbers, the number of ports, precoding, and the like for the RS), information related to new candidate beam identification (NCBI) (for example, the above-mentioned threshold value), and the like may be configured (notified) for the UE by using higher layer signaling or the like. Information related to the new candidate RS (or the NCBI-RS) may be obtained on the basis of information related to the BFD-RS. The information related to the NCBI-RS may be referred to as information related to an NBCI resource or the like.

Note that the BFD-RS, the NCBI-RS, and the like may be interpreted as a radio link monitoring reference signal (Radio Link Monitoring RS (RLM-RS)).

At step S104, the UE that has identified the new candidate beam transmits a beam recovery request (Beam Failure Recovery reQuest (BFRQ)). The beam recovery request may be referred to as a beam recovery request signal, a beam failure recovery request signal, or the like.

The BFRQ may be transmitted by using, for example, at least one of an uplink control channel (Physical Uplink Control Channel (PUCCH)), a random access channel (Physical Random Access Channel (PRACH)), an uplink shared channel (Physical Uplink Shared Channel (PUSCH)), and a configured grant (CG) PUSCH.

The BFRQ may include information about the new candidate beam/new candidate RS identified at step S103. A resource for the BFRQ may be associated with the new candidate beam. The information about the beam may be notified by using a beam index (BI), a port index of a certain reference signal, an RS index, a resource index (for example, a CSI-RS resource indicator (CRI)), an SSB resource indicator (SSBRI), or the like.

For Rel-15 NR, CB-BFR (Contention-Based BFR) that is BFR based on contention-based random access (PA) procedure and CF-BFR (Contention-Free BFR) that is BFR based on non-contention-based random access procedure are under study. In the CB-BFR and the CF-BFR, the UE may transmit a preamble (also referred to as an RA preamble, a random access channel (Physical Random Access Channel (PRACH)), a RACH preamble, or the like) as the BFRQ by using a PRACH resource.

In the CB-BFR, the UE may transmit a preamble randomly selected from one or a plurality of preambles. On the other hand, in the CF-BFR, the UE may transmit a preamble allocated from the base station in a UE-specific manner. In the CB-BFR, the base station may allocate an identical preamble to a plurality of UEs. In the CF-BFR, the base station may allocate a preamble in a UE-dedicated manner.

Note that the CB-BFR and the CF-BFR may be referred to as CB PRACH-based BFR (contention-based PRACH-based BFR (CBRA-BFR)) and CF PRACH-based BFR (contention-free PRACH-based BFR (CFRA-BFR)), respectively. The CBRA-BFR may be referred to as CBRA for BFR. The CFRA-BFR may be referred to as CFRA for BFR.

In both of the CB-BFR and the CF-BFR, information related to the PRACH resource (PA preamble) may be notified by using, for example, higher layer signaling (RRC signaling or the like). For example, the information may include information indicating correspondence between detected DL-RSs (beams) and PRACH resources, and a different PRACH resource may be associated with each DL-RS.

At step S105, the base station that has detected the BFRQ transmits a response signal (which may be referred to as gNB response or the like) in response to the BFRQ from the UE. The response signal may include reconfiguration information about one or a plurality of beams (for example, DL-RS resource configuration information).

The response signal may be transmitted in, for example, a UE-common search space of a PDCCH. The response signal may be notified by using a PDCCH (DCI) cyclic redundancy check (CRC)-scrambled by a UE identifier (for example, a cell-radio RNTI (C-RNTI)). The UE may judge, on the basis of beam reconfiguration information, at least one of a transmit beam and a receive beam to be used.

The UE may monitor the response signal on the basis of at least one of a control resource set (CORESET) for BFR and a search space set for BFR.

With respect to the CB-BFR, when the UE receives a PDCCH corresponding to a C-RNTI related to the UE itself, it may be judged that contention resolution has succeeded.

With respect to processing at step S105, a period for the UE to monitor response from the base station (for example, gNB) to the BFRQ may be configured. The period may be referred to as, for example, a gNB response window, a gNB window, a beam recovery request response window, or the like. The UE may perform retransmission of the BFRQ when there is no gNB response detected in the window period.

At step S106, the UE may transmit, to the base station, a message indicating that beam reconfiguration has been completed. For example, the message may be transmitted on a PUCCH, or may be transmitted on a PUSCH.

Beam recovery success (BR success) may represent, for example, a case where step S106 has been reached. On the other hand, beam recovery failure (BR failure) may correspond to, for example, a case that BFRQ transmission has reached a certain number of times or a case that a beam failure recovery timer (Beam-failure-recovery-Timer) has expired.

In Rel. 15, a case that beam recovery procedure (for example, BFRQ notification) for beam failure detected in an SpCell (PCell/PSCell) is performed by using random access procedure is supported. On the other hand, in Rel. 16, a case that beam recovery procedure (for example, BFRQ notification) for beam failure detected in an SCell is performed by using at least one of PUCCH (for example, scheduling request (SR)) transmission for BFR and MAC CE (for example, UL-SCH) transmission for BFR is supported.

For example, the UE may transmit information related to beam failure by using two MAC CE-based steps. The information related to the beam failure may include information related to a cell in which the beam failure has been detected and information related to a new candidate beam (or a new candidate RS index).

[Step 1]

When BF has been detected, a PUCCH-BFR (scheduling request (SR)) may be transmitted from the UE to the PCell/PSCell. Subsequently, a UL grant (DCI) for step 2 described below may be transmitted from the PCell/PSCell to the UE. In a case where beam failure has been detected, when a MAC CE (or a UL-SCH) for transmitting information related to a new candidate beam is present, step 1 (for example, PUCCH transmission) may be omitted to perform step 2 (for example, MAC CE transmission).

[Step 2]

Subsequently, the UE may transmit, to the base station (PCell/PSCell), information (for example, cell index) related to a (unsuccessful) cell in which the beam failure has been detected and the information related to the new candidate beam by using the MAC CE via an uplink channel (for example, a PUSCH). After that, after BFR procedure, QCL of a PDCCH/PUCCH/PDSCH/PUSCH may be updated to a new beam after a certain period (for example, 28 symbols) from reception of a response signal from the base station.

Note that these step numbers are just numbers for description, and a plurality of steps may be combined with each other, or the order of the steps may be changed. Whether to perform the BFR may be configured for the UE by using higher layer signaling.

(BFD-RS)

In Rel. 16, for each of BWPs of one serving cell, set q0 bar of periodic (P)-CSI-RS resource configuration indices and set q1 bar of at least one of P-CSI-RS resource configuration indices and SS/PBCH block indices can be provided for the UE by failure detection resources (failureDetectionResources, failureDetectionResourcesToAddModList, RadioLinkMonitoringConfig) and a candidate beam RS list (candidateBeamRSList), an extended candidate beam RS list (candidateBeamRSListExt-r16), or a candidate beam RS list for an SCell (candidateBeamRSSCellList-r16), respectively.

Here, q0 bar is an expression in which an overline is added to "q0." Hereinafter, q0 bar is simply expressed as q0. q1 bar is an expression in which an overline is added to "q1." Hereinafter, q1 bar is simply expressed as q1.

Set q0 of P-CSI-RS resources provided by the failure detection resources may be referred to as an explicit BFD-RS.

The UE may perform L1-RSRP measurement and the like by using RS resources corresponding to indices included in at least one set of set q0 and set q1 to detect beam failure.

Note that in the present disclosure, a case that the above-mentioned higher layer parameter indicating information about an index corresponding to a BFD resource is provided and each of a case that a BFD resource is configured, a case that a BFD-RS is configured, and the like may be interchangeably interpreted. In the present disclosure, the BFD resource, set q0 of periodic CSI-RS resource configuration indices or SSB indices, a BFD-RS, a BFD-RS set, and an RS set may be interchangeably interpreted.

For one BWP of the serving cell, if $q_0$ is not provided for the UE by failure detection resources (failureDetectionResources), the UE determines that a P-CSI-RS resource configuration index having the same value as an RS index in an RS set indicated by a TCI state (TCI-State) for a corresponding CORESET is included in set q0, the CORESET being used for PDCCH monitoring. If two RS indices are present in one TCI state, set q0 includes an RS index having a QCL type D configuration for a corresponding TCI state. The UE assumes that set q0 includes up to two RS indices. The UE assumes a single port RS in set q0.

This set q0 may be referred to as an implicit BFD-RS.

Thus, the UE determines the BFD-RS (RS set) by using a TCI state for a PDCCH. The UE assumes that the RS set includes up to two RSs.

(Analysis)

Improvement in reliability of the PDCCH is under study. In order to enable PDCCH transmission using two TCI states to be performed, support for one CORESET having two active TCI states is under study. Specifically, a combination of a single frequency network (SFN) scheme and a case that one PDCCH candidate in a given search space set is associated with both two TCI states for the CORESET is under study.

As mentioned above, in RLM in Rel. 16, when $L_{max}=4$, the UE selects $N_{RLM}$ RSs on the basis of an order of monitoring periodicities of the search space set and an order of CORESET indices (rule). However, an RLM-RS in a case where two TCI states have been activated for a CORESET determined on the basis of this rule is indefinite. For example, in this case, whether one TCI state is used for RLM and whether both RSs are used for RLM are issues.

As mentioned above, in BFD in Rel. 16, the UE assumes that the RS set includes up to two RSs. However, a BFD-RS in a case where two TCI states have been activated for the CORESET is indefinite. For example, whether a case that the number of RSs in an active TCI state for the CORESET is more than 2 is supported is indefinite. If the case is supported, how an RS for BFD is selected is indefinite.

Thus, the inventors of the present invention came up with the idea of a method for determining an RS for RLM/BFD.

Embodiments according to the present disclosure will be described in detail with reference to the drawings as follows. The radio communication methods according to respective embodiments may each be employed individually, or may be employed in combination.

In the present disclosure, "A/B/C" and "at least one of A, B, and C" may be interchangeably interpreted. In the present disclosure, a cell, a serving cell, a CC, a carrier, a BWP, a DL BWP, a UL BWP, an active DL BWP, an active UL BWP, and a band may be interchangeably interpreted. In the present disclosure, an index, an ID, an indicator, and a resource ID may be interchangeably interpreted. In the present disclosure, "support," "control," "controllable," "operate," and "operable" may be interchangeably interpreted.

In the present disclosure, configuration (configure), activation (activate), update, indication (indicate), enabling (enable), specification (specify), and selection (select) may be interchangeably interpreted.

In the present disclosure, the higher layer signaling may be, for example, any one or combinations of Radio Resource Control (RRC) signaling, Medium Access Control (MAC) signaling, broadcast information, and the like. In the present disclosure, RRC, RRC signaling, an RRC parameter, a higher layer, a higher layer parameter, an RRC information element (IE), and an RRC message may be interchangeably interpreted.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

In the present disclosure, a MAC CE and an activation/deactivation command may be interchangeably interpreted.

In the present disclosure, a beam, a spatial domain filter, a spatial setting, a TCI state, a UL TCI state, a unified TCI state, a unified beam, a common TCI state, a common beam, TCI assumption, QCL assumption, a QCL parameter, a spatial domain reception filter, a UE spatial domain reception filter, a UE receive beam, a DL beam, a DL receive beam, DL precoding, a DL precoder, a DL-RS, an RS of QCL type D in a TCI state/QCL assumption, an RS of QCL type A in a TCI state/QCL assumption, a spatial relation, a spatial domain transmission filter, a UE spatial domain transmission filter, a UE transmit beam, a UL beam, a UL transmit beam, UL precoding, a UL precoder, and a PL-RS may be interchangeably interpreted. In the present disclosure, a QCL type X-RS, a DL-RS associated with QCL type X, and a DL-RS, a DL-RS source, an SSB, a CSI-RS, or an SRS having QCL type X may be interchangeably interpreted.

In the present disclosure, a panel, an Uplink (UL) transmission entity, a TRP, a spatial relation, a control resource set (COntrol REsource SET (CORESET)), a PDSCH, a codeword, a base station, an antenna port for a certain signal (for example, a demodulation reference signal (DMRS) port), an antenna port group for a certain signal (for example, a DMRS port group), a group for multiplexing (for example, a code division multiplexing (CDM) group, a reference signal group, or a CORESET group), a CORESET pool, a CORESET subset, a CW, a redundancy version (RV), and a layer (MIMO layer, transmission layer, spatial layer) may be interchangeably interpreted. A panel Identifier (ID) and a panel may be interchangeably interpreted. In the present disclosure, a TRP ID, a TRP-related ID, a CORESET pool index, a location of one TCI state out of two TCI states corresponding to one code point of a field in DCI (ordinal number, first TCI state or second TCI state), and a TRP may be interchangeably interpreted.

In the present disclosure, a TRP, a transmission point, a panel, a DMRS port group, a CORESET pool, and one of two TCI states associated with one code point of a TCI field may be interchangeably interpreted.

In the present disclosure, a single TRP, a single TRP system, single TRP transmission, and a single PDSCH may be interchangeably interpreted. In the present disclosure, multiple TRPs, a multi-TRP system, multi-TRP transmission, and multiple PDSCHs may be interchangeably interpreted. In the present disclosure, single DCI, a single PDCCH, multiple TRPs based on single DCI, and activation of two TCI states on at least one TCI code point may be interchangeably interpreted.

In the present disclosure, a single TRP, a channel using a single TRP, a channel using one TCI state/spatial relation, a case that multiple TRPs are not enabled by RRC/DCI, a case that a plurality of TCI states/spatial relations are not enabled by RRC/DCI, and a case that a CORESET pool index (CORESETPoolIndex) value with 1 is not configured for any CORESET, and any code point of a TCI field is not mapped to two TCI states may be interchangeably interpreted.

In the present disclosure, multiple TRPs, a channel using multiple TRPs, a channel using a plurality of TCI states/spatial relations, a case that multiple TRPs are enabled by RRC/DCI, a case that a plurality of TCI states/spatial relations are enabled by RRC/DCI, and at least one of multiple TRPs based on single DCI and multiple TRPs based on multiple DCI may be interchangeably interpreted. In the present disclosure, multiple TRPs based on multiple DCI and a case that a CORESET pool index (CORESETPoolIndex) value with 1 is configured for a CORESET may be interchangeably interpreted. In the present disclosure, multiple TRPs based on single DCI and a case that at least one code point of a TCI field is mapped to two TCI states may be interchangeably interpreted.

In the present disclosure, TRP #1 (first TRP) may correspond to a CORESET pool index=0, or may correspond to a first TCI state out of two TCI states corresponding to one code point of a TCI field. TRP #2 (second TRP) may correspond to a CORESET pool index=1, or may correspond to a second TCI state out of the two TCI states corresponding to one code point of the TCI field.

In the present disclosure, a pool, a set, a group, and a list may be interchangeably interpreted.

In the present disclosure, BFR, BFR configuration, a BFD-RS, BFD-RS configuration, RLM configuration, an RLM-RS, and RLM-RS configuration may be interchangeably interpreted. In the present disclosure, per-cell BFR, cell-specific BFR, and BFR in Rel. 15/16 may be interchangeably interpreted. In the present disclosure, per-TRP BFR, TRP-specific BFR, and BFR in Rel. 17/later versions of Rel. 17 may be interchangeably interpreted.

(Radio Communication Method)

A UE may receive a MAC CE indicating two TCI states for one CORESET. When an information element (RadioLinkMonitoringRS) of an RLM-RS is not provided, the UE may use, for RLM, an RS in at least one TCI state out of two active TCI states. When an information element (failureDetectionResources) of a failure detection resource (BFD-RS) is not provided, the UE may use, for BFD, an RS in at least one TCI state out of the two active TCI states. The UE may use the two active TCI states for respective receptions of two repetitions of a PDCCH.

First Embodiment

For RLM, if an RLM-RS (RadioLinkMonitoringRS) is not provided for the UE, and $L_{max}$=4, the UE selects $N_{RLM}$ RSs on the basis of at least one rule of aspect 1-1 to aspect 1-5 below.

<<Aspect 1-1>>

The UE selects $N_{RLM}$ RSs on the basis of a rule in Rel. 16 in which a monitoring periodicity of a search space set and a CORESET index are used.

For the RLM, if an RLM-RS (RadioLinkMonitoringRS) is not provided for the UE, and $L_{max}$=4, the UE may select, in order starting from the shortest (lowest) monitoring periodicity (of a plurality of search space sets), $N_{RLM}$ RSs provided for an active TCI state for PDCCH reception in a plurality of CORESETs associated with the plurality of search space sets. If more than one CORESET is associated with a plurality of search space sets having the same monitoring periodicity, the UE may determine a CORESET order starting from the highest CORESET index.

If two TCI states have been activated for a CORESET selected on the basis of this rule, an RS to be selected may follow any one of aspect 1-1-1 to aspect 1-1-3 below.

[Aspect 1-1-1]

An RS in both the TCI states can be selected for the RLM. For TCI states for one CORESET, the UE determines a TCI state order starting from the highest (or lowest) TCI state ID. The UE may select an RS for the RLM on the basis of the TCI states in that order.

Figure 3A:
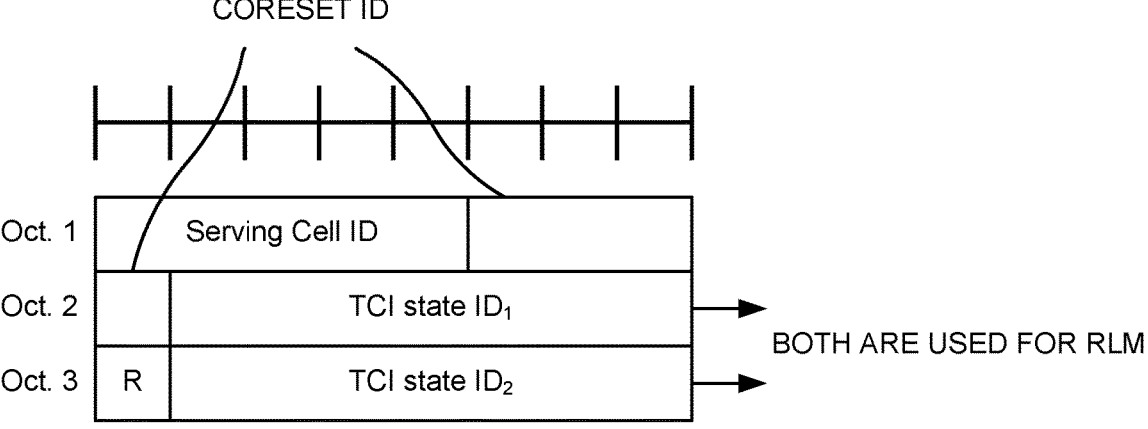
FIGS. 3A to 3C are each a diagram to show an example of an RLM-RS according to a first embodiment.

In an example of FIG. 3A, a MAC CE to activate two TCI states for each CORESET may be defined. This MAC CE may be an enhanced PDCCH TCI indication MAC CE (for example, an Enhanced TCI state Indication for UE-specific PDCCH MAC CE). The enhanced PDCCH TCI indication MAC CE may include at least one of a serving cell ID field, a CORESET ID field, a TCI state ID 1 (first TCI state) field, an R (reserved bit) field, and a TCI state ID 2 (second TCI state) field. Both a first TCI state indicated by the TCI state ID 1 field and a second TCI state indicated by the TCI state ID 2 field may be used for the RLM.

[Aspect 1-1-2]

Only an RS in a first (or second) TCI state activated by the MAC CE can be selected for the RLM.

Figure 3B:
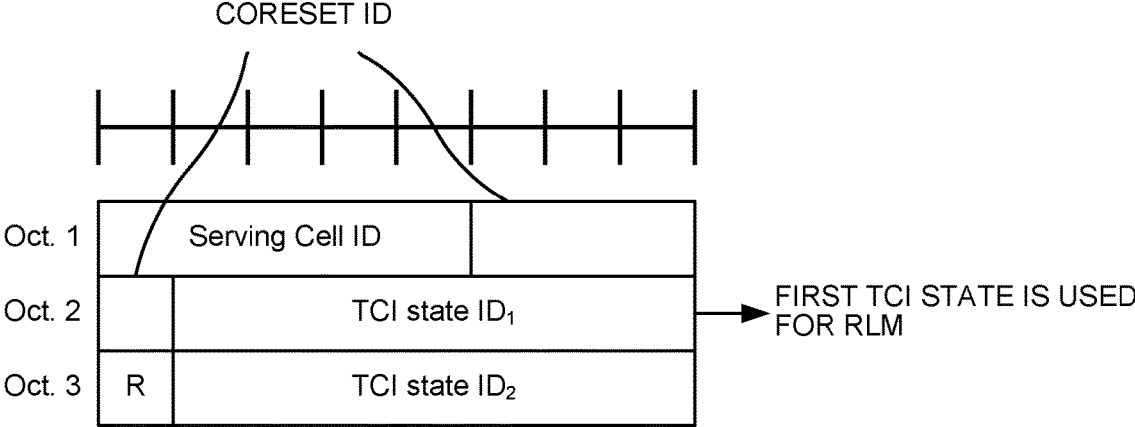

In an example of FIG. 3B, a structure of the enhanced PDCCH TCI indication MAC CE is similar to that of FIG. 3A. Only the first TCI state indicated by the TCI state ID 1 field may be used for the RLM.

[Aspect 1-1-3]

Only an RS in a TCI state having a lower (or higher) TCI state ID can be selected for the RLM.

Figure 3C:
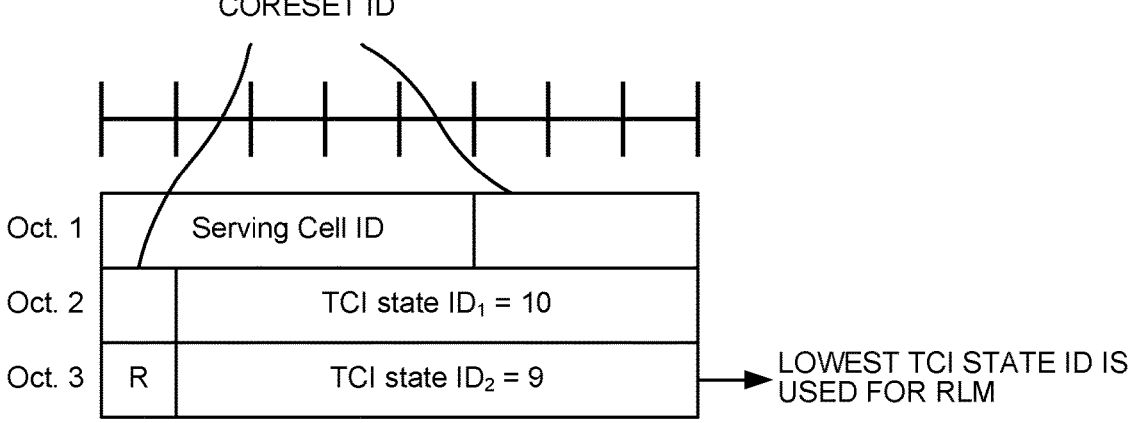

In an example of FIG. 3C, a structure of the enhanced PDCCH TCI indication MAC CE is similar to that of FIG. 3A. Only a TCI state having a lower (lowest) ID out of a first TCI state ID indicated by the TCI state ID 1 field and a second TCI state ID indicated by the TCI state ID 2 field may be used for the RLM.

<<Aspect 1-2>>

The UE selects $N_{RLM}$ RSs on the basis of a new rule in which a CORESET index is used.

For the RLM, if an RLM-RS (RadioLinkMonitoringRS) is not provided for the UE, and $L_{max}$=4, the UE may select, in order starting from the highest CORESET index, $N_{RLM}$ RSs provided for an active TCI state for PDCCH reception in a plurality of CORESETs. In this new rule, monitoring periodicities of the search space sets in the rule in Rel. 16 may not be considered.

If two TCI states have been activated for a CORESET selected on the basis of this rule, an RS to be selected may follow any one of aspect 1-1-1 to aspect 1-1-3.

<<Aspect 1-3>>

The UE selects $N_{RLM}$ RSs on the basis of a new rule in which a TCI state ID is used.

For the RLM, if an RLM-RS (RadioLinkMonitoringRS) is not provided for the UE, and $L_{max}$=4, the UE may select, in order starting from the highest (or lowest) TCI state ID, $N_{RLM}$ RSs provided for an active TCI state for PDCCH reception. This new rule may be based only on a TCI state ID order.

Any one of aspect 1-1-1 to aspect 1-1-3 may be used for a CORESET for which two TCI states have been activated.

<<Aspect 1-4>>

Any one of rules of aspect 1-1 to aspect 1-3 is also applied to at least one of $L_{max}$=8 and $L_{max}$=64.

<<Aspect 1-5>>

$N_{RLM}$ corresponding to at least one of $L_{max}$=4, $L_{max}$=8, and $L_{max}$=64 may be greater than $N_{RLM}$ in Rel. 16. For example, for $L_{max}$=4, $N_{RLM}$ may be $N_{RLM}$=2. $N_{LR\text{-}RLM}$ corresponding to at least one of $L_{max}=4$, $L_{max}=8$, and $L_{max}=64$ may be greater than $N_{LR-RLM}$ in Rel. 16. $N_{LR-RLM}$ may be greater than or equal to $N_{RLM}$. For example, for $L_{max}=4$, $N_{RLM}$ may be $N_{RLM}=4$ and $N_{LR-RLM}$ may be greater than or equal to 4.

According to this embodiment, even when an RLM-RS is not provided for the UE, the UE can appropriately determine an RS for RLM.

Second Embodiment

For BFD/BFR, if a failure detection resource (failureDetectionResources) is not provided for a UE, the UE follows any one of aspect 2-1 and aspect 2-2 below.

<<Aspect 2-1>>

The UE assumes that the number of BFD-RSs determined on the basis of an active TCI state for a PDCCH monitoring CORESET is up to X.

For a CORESET for which two TCI states have been activated, when a failure detection resource (failureDetectionResources) is not provided for the UE for the BFD, the UE may follow any one of aspect 2-1-1 to aspect 2-1-3 below.

[Aspect 2-1-1]

An RS in both the TCI states can be selected for the BFD. For TCI states for one CORESET, the UE may determine a TCI state order starting from the highest (or lowest) TCI state ID. The UE may select an RS for the BFD on the basis of the TCI states in that order.

Figure 4A:
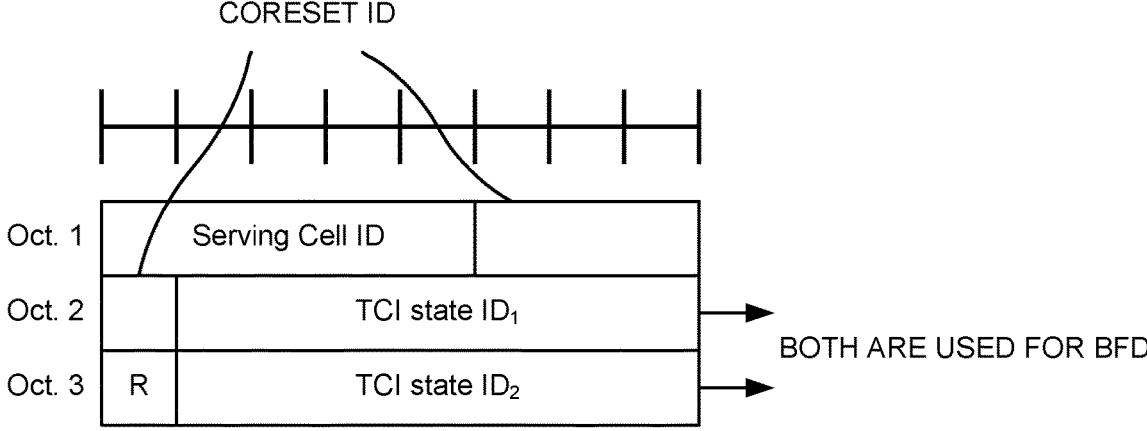
FIGS. 4A to 4C are each a diagram to show an example of a BFD-RS according to a second embodiment.

In an example of FIG. 4A, a structure of the enhanced PDCCH TCI indication MAC CE is similar to that of FIG. 3A. Both a first TCI state indicated by the TCI state ID 1 field and a second TCI state indicated by the TCI state ID 2 field may be used for the BFD.

[Aspect 2-1-2]

Only an RS in a first (or second) TCI state activated by the MAC CE can be selected for the BFD.

Figure 4B:
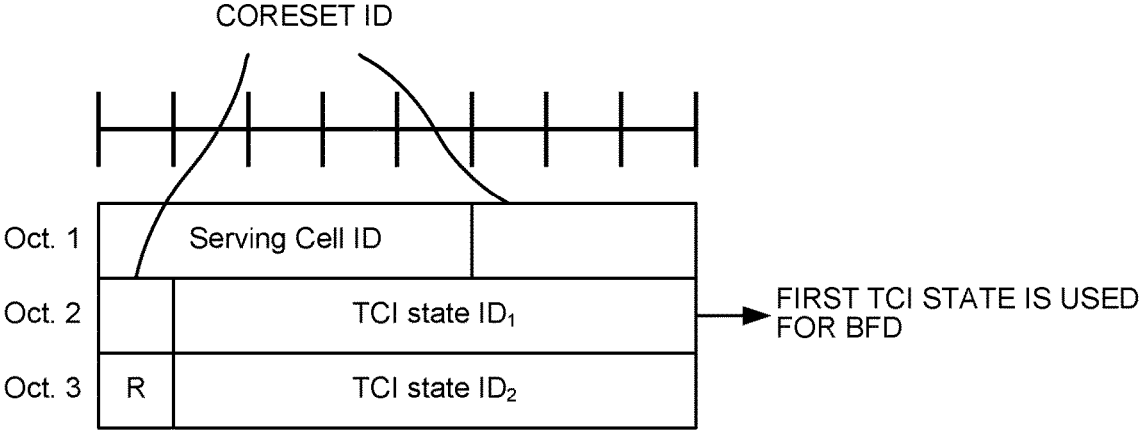

In an example of FIG. 4B, a structure of the enhanced PDCCH TCI indication MAC CE is similar to that of FIG. 3A. Only the first TCI state indicated by the TCI state ID 1 field may be used for the BFD.

[Aspect 2-1-3]

Only an RS in a TCI state having a lower (or higher) TCI state ID can be selected for the BFD.

Figure 4C:
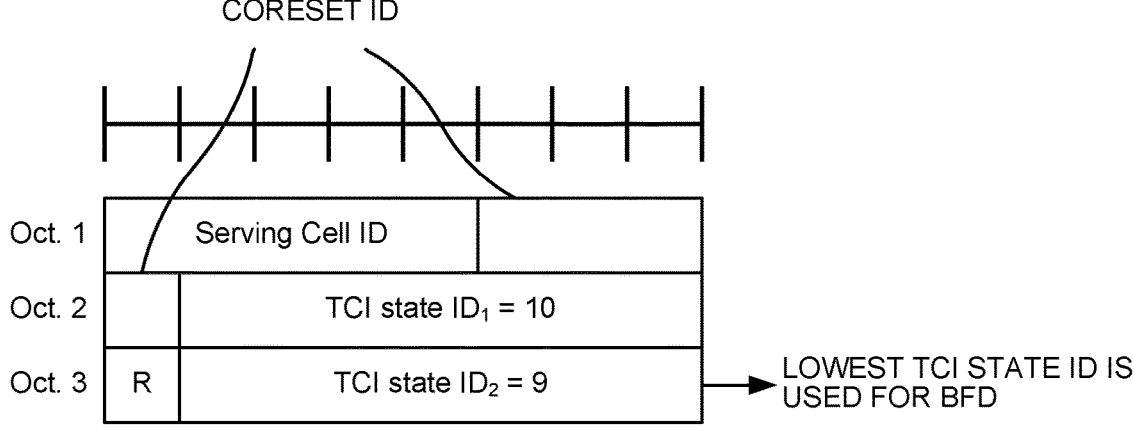

In an example of FIG. 4C, a structure of the enhanced PDCCH TCI indication MAC CE is similar to that of FIG. 3A. Only a TCI state having a lower (lowest) ID out of a first TCI state ID indicated by the TCI state ID 1 field and a second TCI state ID indicated by the TCI state ID 2 field may be used for the BFD.

An X value may be defined in specifications, may be configured by higher layer signaling, or may be reported as UE capability information. Different values of X corresponding to different values of $L_{max}$ may be defined in specifications, may be configured by higher layer signaling, or may be reported as UE capability information. The X value may be 2 similar to that of Rel. 16.

<<Aspect 2-2>>

The UE assumes that the number of BFD-RSs determined on the basis of an active TCI state for a PDCCH monitoring CORESET may be greater than X, and the UE selects X RSs on the basis of a rule. The rule may be similar to a rule of selection of the RLM-RS in the first embodiment. The UE may follow any one of aspect 2-2A to aspect 2-2C below.

{Aspect 2-2A}

The UE selects, in order starting from the shortest (lowest) monitoring periodicity (of a plurality of search space sets), X RSs provided for an active TCI state for PDCCH reception in a plurality of CORESETs associated with the plurality of search space sets. If more than one CORESET is associated with a plurality of search space sets having the same monitoring periodicity, the UE may determine a CORESET order starting from the highest CORESET index.

If two TCI states have been activated for a CORESET selected on the basis of this rule, an RS to be selected may follow any one of aspect 2-2A-1 to aspect 2-2A-3 below.

[Aspect 2-2A-1]

An RS in both the TCI states can be selected for the BFD. For TCI states for one CORESET, the UE may determine a TCI state order starting from the highest (or lowest) TCI state ID. The UE may select an RS for the BFD on the basis of the TCI states in that order.

In this case, the example of FIG. 4A may be used.

[Aspect 2-2A-2]

Only an RS in a first (or second) TCI state activated by the MAC CE can be selected for the BFD.

In this case, the example of FIG. 4B may be used.

[Aspect 2-2A-3]

Only an RS in a TCI state having a lower (or higher) TCI state ID can be selected for the BFD.

In this case, the example of FIG. 4C may be used.

{Aspect 2-2B}

The UE selects, in order starting from the highest CORESET index, X RSs provided for an active TCI state for PDCCH reception in a plurality of CORESETs.

If two TCI states have been activated for a CORESET selected on the basis of this rule, an RS to be selected may follow any one of aspect 2-2A-1 to aspect 2-2A-3.

{Aspect 2-2C}

The UE selects, in order starting from the highest (or lowest) TCI state ID, X RSs provided for an active TCI state for PDCCH reception.

For a CORESET for which two TCI states have been activated, an RS to be selected may follow any one of aspect 2-2A-1 to aspect 2-2A-3.

An X value may be defined in specifications, may be configured by higher layer signaling, or may be reported as UE capability information. Different values of X corresponding to different values of $L_{max}$ may be defined in specifications, may be configured by higher layer signaling, or may be reported as UE capability information. The X value may be 2 similar to that of Rel. 16.

According to this embodiment, even when a failure detection resource is not provided for the UE, the UE can appropriately determine an RS for BFD.

Third Embodiment

When BFD/BFR for each of TRPs is enabled and if a failure detection resource (failureDetectionResources) is not provided for a UE, two sets of BFD-RSs are determined for two respective TRPs. The UE may follow any one of aspect 3-1 and aspect 3-2 below.

<<Aspect 3-1>>

For TRP, the UE assumes that the number of BFD-RSs determined on the basis of an active TCI state for a PDCCH monitoring CORESET is up to X.

The UE may follow at least one of aspect 3-1A to aspect 3-1C below.

{Aspect 3-1A}

For the BFD, when the failure detection resource is not provided for the UE, and two TCI states have been activated for one CORESET, the UE may follow any one of aspect 3-1A-1 and aspect 3-1A-2 below.

17
18

[Aspect 3-1A-1]

An RS in a first TCI state and an RS in a second TCI state may be used for the BFD in respective a first TRP and a second TRP, the first and second TCI states being activated by a MAC CE.

Figure 5A:
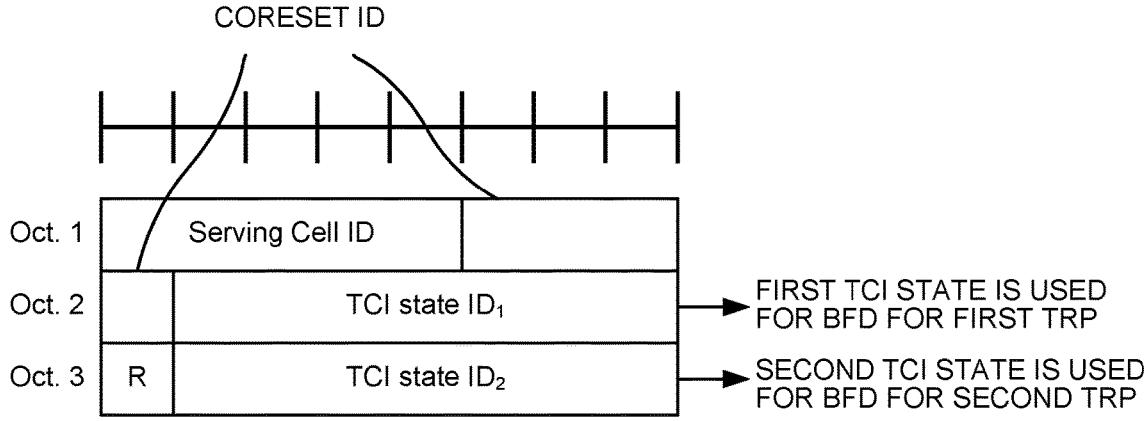
FIGS. 5A and 5B are each a diagram to show an example of a BFD-RS according to a third embodiment.

In an example of FIG. 5A, a structure of the enhanced PDCCH TCI indication MAC CE is similar to that of FIG. 3A. A first TCI state indicated by a TCI state ID 1 field may be used for BFD for the first TRP. A second TCI state indicated by a TCI state ID 2 field may be used for BFD for the second TRP.

An RS in a first TCI state and an RS in a second TCI state may be used for the BFD in respective the first TRP and the second TRP, the first and second TCI states being activated by a MAC CE.

[Aspect 3-1A-2]

An RS in a TCI state having a lower TCI state ID and an RS in a TCI state having a higher TCI state ID, out of the two TCI states, may be used for the BFD in the first TRP and the second TRP, respectively.

Figure 5B:
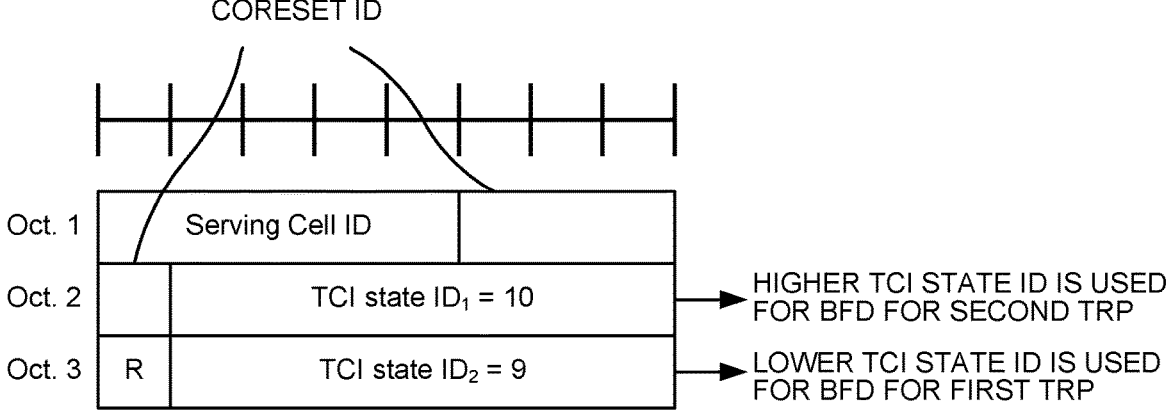

In an example of FIG. 5B, a structure of the enhanced PDCCH TCI indication MAC CE is similar to that of FIG. 3A. A TCI state having a lower TCI state ID (9) and a TCI state having a higher TCI state ID (10), out of two TCI state IDs indicated by a TCI state ID 1 field and a TCI state ID 2 field, may be used for BFD for the first TRP and BFD for the first TRP, respectively.

An RS in a TCI state having a higher TCI state ID and an RS in a TCI state having a lower TCI state ID, out of the two TCI states, may be used for the BFD in the first TRP and the second TRP, respectively.

{Aspect 3-1B}

For the BFD, when the failure detection resource is not provided for the UE, and one TCI state has been activated for one CORESET, the UE may follow any one of aspect 3-1B-1 to aspect 3-1B-3 below. For example, this case may be a case where some CORESETs are used for multi-TRP repetition, and where some other CORESETs are used for a single TRP.

[Aspect 3-1B-1]

An RS in the one TCI state is used for BFD for the first (or second) TRP. This operation may be a default.

[Aspect 3-1B-2]

An index corresponding to a TRP can be configured for a CORESET. For example, this index may be a group ID, a TRP ID, a CORESET pool index, or the like. An RS in the one TCI state is used for BFD for a TRP corresponding to a corresponding CORESET.

[Aspect 3-1B-3]

An RS in the one TCI state is not used for BFD.

{Aspect 3-1C}

For the BFD, when the failure detection resource is not provided for the UE, the UE assumes, for each TRP, that the number of RSs to be determined (BFD-RSs determined on the basis of an active TCI state for a PDCCH monitoring CORESET) is up to X.

An X value may be defined in specifications, may be configured by higher layer signaling, or may be reported as UE capability information. Different values of X corresponding to different values of $L_{max}$ may be defined in specifications, may be configured by higher layer signaling, or may be reported as UE capability information. The X value may be 2 similar to that of Rel. 16.

For example, when X=1, up to one RS is determined for each TRP, and up to two RSs in total are determined.

<<Aspect 3-2>>

The UE assumes, for each TRP, that the number of BFD-RSs determined on the basis of an active TCI state for a PDCCH monitoring CORESET may be greater than X, and the UE selects, for each TRP, X RSs on the basis of a rule.

The rule may be at least one of aspect 3-2A to aspect 3-2C below.

{Aspect 3-2A}

The UE selects, in order starting from the shortest (lowest) monitoring periodicity (of a plurality of search space sets), X RSs provided for an active TCI state for PDCCH reception in a plurality of CORESETs associated with the plurality of search space sets. If more than one CORESET is associated with a plurality of search space sets having the same monitoring periodicity, the UE may determine a CORESET order starting from the highest CORESET index.

If two TCI states have been activated for a CORESET selected on the basis of the rule, the UE may follow any one of aspect 3-2AA-1 to aspect 3-2AA-2 below.

[Aspect 3-2AA-1]

An RS in a first TCI state and an RS in a second TCI state may be used for the BFD in respective the first TRP and the second TRP, the first and second TCI states being activated by a MAC CE.

In this case, the example of FIG. 5A may be used.

An RS in a first TCI state and an RS in a second TCI state may be used for the BFD in respective the first TRP and the second TRP, the first and second TCI states being activated by a MAC CE.

[Aspect 3-2AA-2]

An RS in a TCI state having a lower TCI state ID and an RS in a TCI state having a higher TCI state ID, out of the two TCI states, may be used for the BFD in the first TRP and the second TRP, respectively.

In this case, the example of FIG. 5B may be used.

An RS in a TCI state having a higher TCI state ID and an RS in a TCI state having a lower TCI state ID, out of the two TCI states, may be used for the BFD in the first TRP and the second TRP, respectively.

If one TCI state has been activated for a CORESET selected on the basis of the rule, the UE may follow any one of aspect 3-2AB-1 to aspect 3-2AB-3 below.

[Aspect 3-2AB-1]

An RS in the one TCI state is selected for BFD for the first (or second) TRP. This operation may be a default.

[Aspect 3-2AB-2]

An index corresponding to a TRP can be configured for a CORESET. For example, this index may be a group ID, a TRP ID, a CORESET pool index, or the like. An RS in the one TCI state is selected for BFD for a TRP corresponding to a corresponding CORESET.

[Aspect 3-2AB-3]

An RS in the one TCI state is not selected.

{Aspect 3-2B}

The UE selects, for each TRP in order starting from the highest CORESET index, X RSs provided for an active TCI state for PDCCH reception in a plurality of CORESETs.

If two TCI states have been activated for a CORESET selected on the basis of this rule, an RS to be selected may follow any one of aspect 3-2AA-1 to aspect 3-2AA-2. If one TCI state has been activated for a CORESET selected on the basis of this rule, an RS to be selected may follow any one of aspect 3-2AB-1 to aspect 3-2AB-3.

{Aspect 3-2C}

The UE selects, for each TRP in order starting from the highest (or lowest) TCI state ID, X RSs provided for an active TCI state for PDCCH reception.

For a CORESET for which two TCI states have been activated, an RS to be selected may follow any one of aspect 3-2AA-1 to aspect 3-2AA-2. For a CORESET for which one TCI states has been activated, an RS to be selected may follow any one of aspect 3-2AB-1 to aspect 3-2AB-3.

An X value may be defined in specifications, may be configured by higher layer signaling, or may be reported as UE capability information. Different values of X corresponding to different values of $L_{max}$ may be defined in specifications, may be configured by higher layer signaling, or may be reported as UE capability information. The X value may be 2 similar to that of Rel. 16.

According to this embodiment, even when BFD/BFR for each of TRPs is enabled, and a failure detection resource is not provided for the UE, the UE can appropriately determine an RS for BFD.

Fourth Embodiment

For RLM, if two TCI states have been activated for a CORESET, a UE does not assume that one or two RLM-RSs (not explicitly provided) are derived in accordance with an implicit rule. In other words, a "case that if two TCI states have been activated for a CORESET (if PDCCH repetition has been configured), the UE assumes that an RLM-RS (RadioLinkMonitoringRS) is always configured" may be defined.

According to this embodiment, the UE can appropriately determine an RS for RLM.

Fifth Embodiment

For RLM, if two TCI states have been activated for a CORESET, a UE does not assume that one or two BFD-RSs (not explicitly provided) are derived in accordance with an implicit rule. In other words, a "case that if two TCI states have been activated for a CORESET (if PDCCH repetition has been configured), the UE assumes that a failure detection resource (failureDetectionResources) is always configured" may be defined.

According to this embodiment, the UE can appropriately determine an RS for BFD.

Sixth Embodiment

A higher layer parameter (RRC information element)/UE capability corresponding to at least one function (characteristic, feature) in the first to fifth embodiments may be defined. The UE capability may indicate that this function is supported.

A UE for which the higher layer parameter corresponding to the function has been configured may perform the function. "A case that a UE for which the higher layer parameter corresponding to the function has not been configured does not perform the function" may be defined.

A UE that has reported the UE capability indicating that the function is supported may perform the function. "A case that a UE that has not reported the UE capability indicating that the function is supported does not perform the function" may be defined.

When a UE has reported the UE capability indicating that the function is supported, and the higher layer parameter corresponding to the function has been configured, the UE may perform the function. "A case that when a UE has not reported the UE capability indicating that the function is supported or when the higher layer parameter corresponding to the function has not been configured, the UE does not perform the function" may be defined.

The UE capability may indicate whether to support one CORESET for which two TCI states are activated (a case that two TCI states are activated for one CORESET).

When two TCI states have been activated for one CORESET, the UE capability may indicate whether to support a case that an RS for RLM or BFD is determined on the basis of the TCI states for the CORESET.

The UE capability may indicate the number of RSs used for RLM or BFD/BFR.

The UE capability may indicate whether to support BFD/BFR for each of TRPs.

When two TCI states have been activated for one CORESET, the UE capability may indicate whether to support BFD/BFR for each TRP.

The UE capability may indicate the number of RSs used for BFD/BFR, the number of RSs being for each TRP.

According to this embodiment, the UE can achieve the above-described function while maintaining compatibility with existing specifications.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 6:
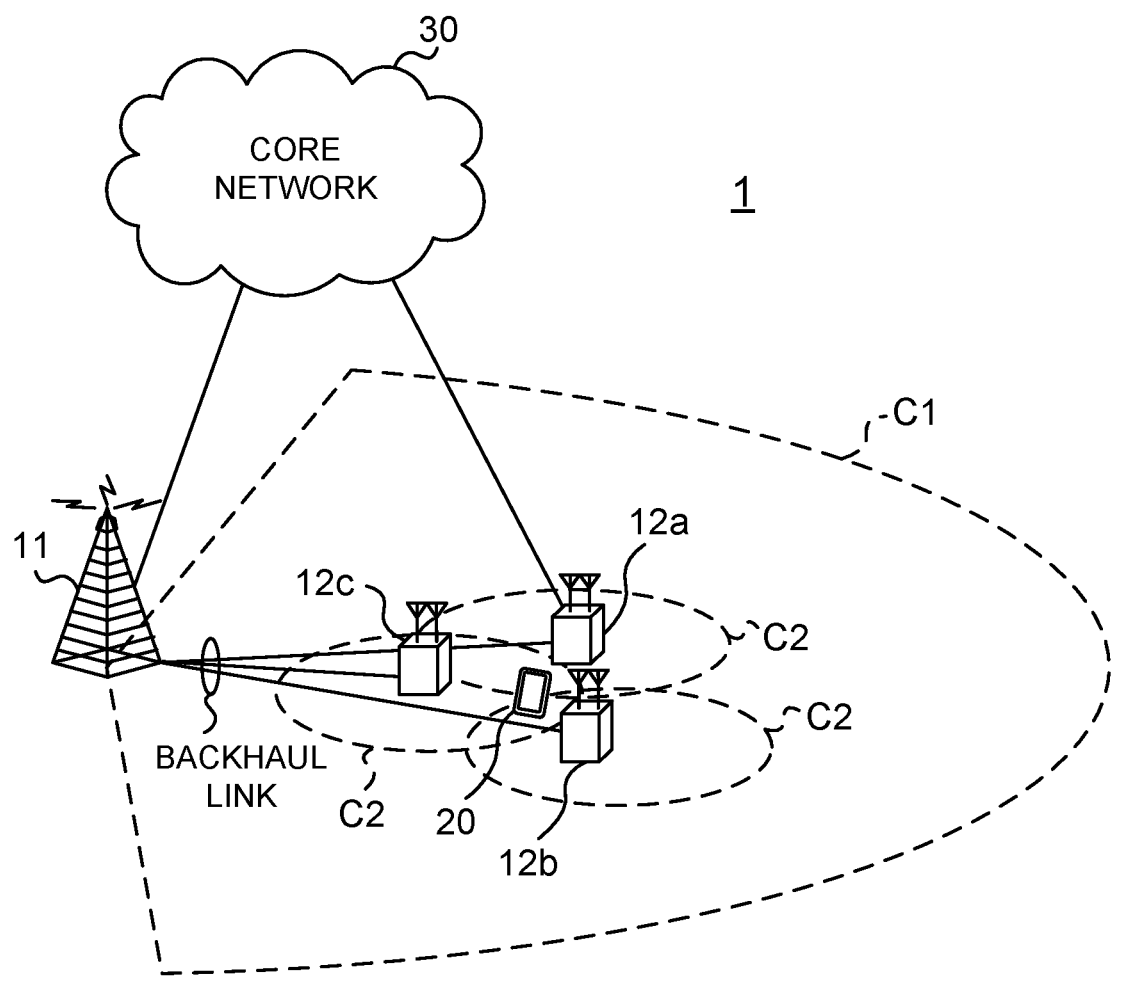
FIG. 6 is a diagram to show an example of a schematic structure of a radio communication system according to one embodiment.

FIG. 6 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 7:
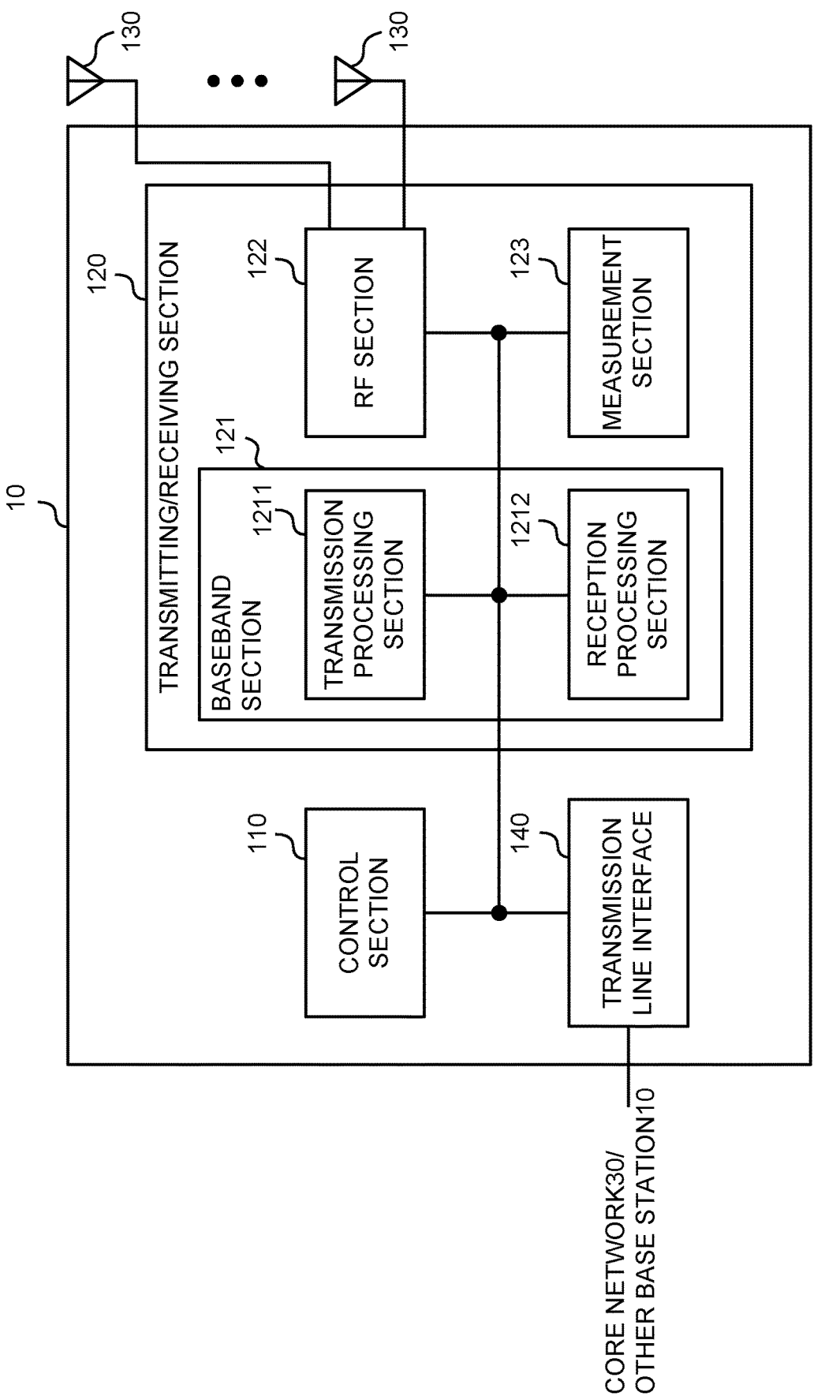
FIG. 7 is a diagram to show an example of a structure of a base station according to one embodiment.

FIG. 7 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

The transmitting/receiving section 120 may transmit a medium access control-control element (MAC CE) indicating two active transmission configuration indicator (TCI) states for one control resource set. When not providing an information element of a radio link monitoring (RLM) reference signal, the control section 110 may use, for RLM, a reference signal in at least one TCI state out of the two active TCI states.

The transmitting/receiving section 120 may transmit a medium access control-control element (MAC CE) indicating two active transmission configuration indicator (TCI)

states for one control resource set. When not providing an information element of a failure detection resource, the control section 110 may use, for beam failure detection (BFD), a reference signal in at least one TCI state out of the two active TCI states.

(User Terminal)

Figure 8:
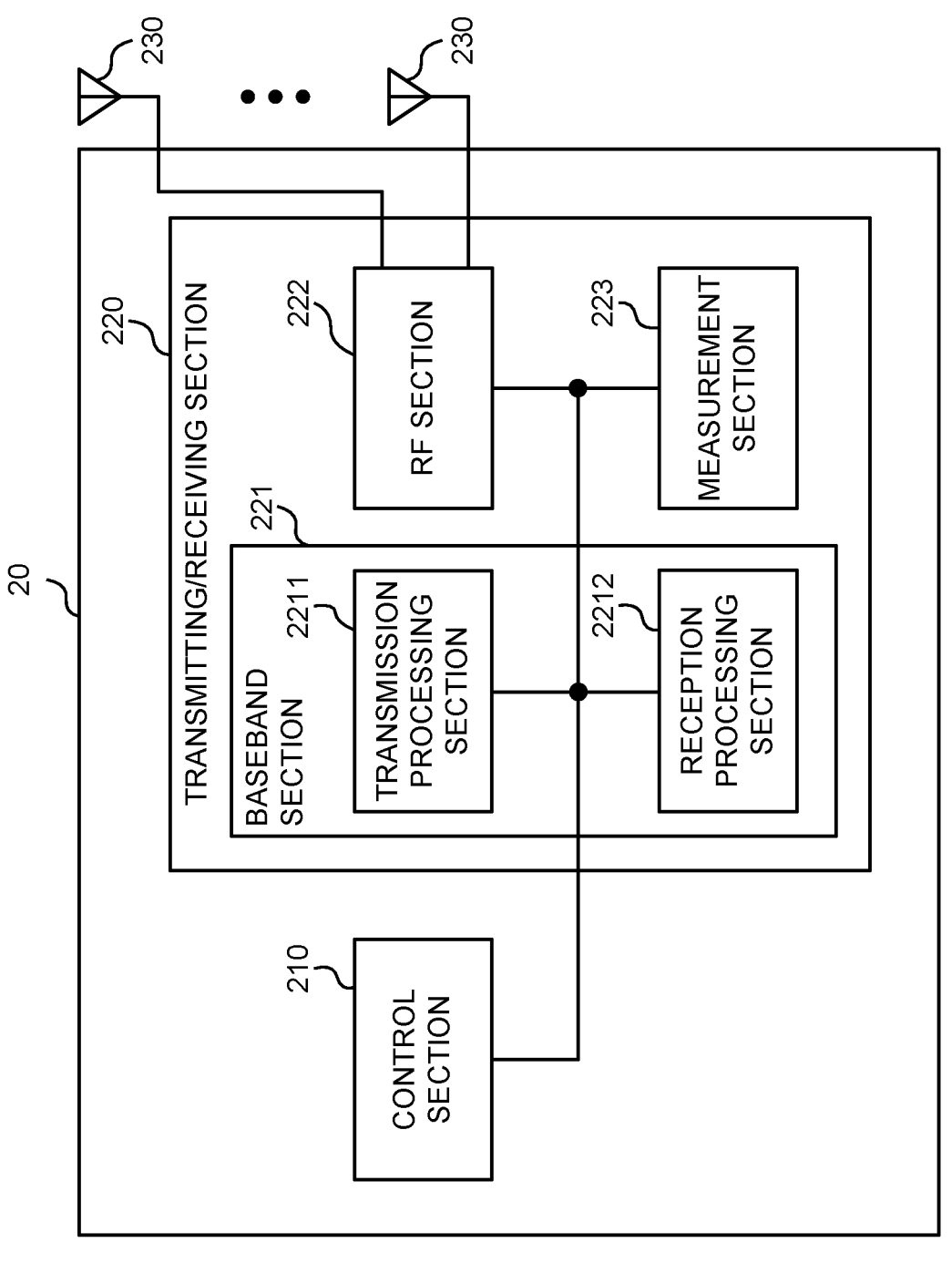
FIG. 8 is a diagram to show an example of a structure of a user terminal according to one embodiment.

FIG. 8 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

The transmitting/receiving section 220 may receive a medium access control-control element (MAC CE) indicating two active transmission configuration indicator (TCI) states for one control resource set. When an information element of a radio link monitoring (RLM) reference signal is not provided, the control section 210 may use, for RLM, a reference signal in at least one TCI state out of the two active TCI states (first embodiment).

The control section 210 may determine, on the basis of respective monitoring periodicities of a plurality of search space sets and respective indices of a plurality of control resource sets associated with the plurality of respective search space sets, the one control resource set out of the plurality of control resource sets (first embodiment, aspect 1-1).

The control section 210 may determine, on the basis of respective indices of a plurality of control resource sets, the one control resource set out of the plurality of control resource sets (first embodiment, aspect 1-2).

The control section 210 may determine the at least one TCI state on the basis of a TCI state ID (first embodiment, aspect 1-3).

The transmitting/receiving section 220 may receive a medium access control-control element (MAC CE) indicating two active transmission configuration indicator (TCI) states for one control resource set. When an information element of a failure detection resource is not provided, the control section 210 may use, for beam failure detection (BFD), a reference signal in at least one TCI state out of the two TCI states (second and third embodiments).

The number of reference signals in a plurality of active TCI states for a plurality of control resource sets including the one control resource set may be a certain number or less (second and third embodiments).

When the number of reference signals in a plurality of active TCI states for a plurality of control resource sets including the one control resource set is greater than a certain number, the control section 210 may use the certain number of reference signals for BFD (second and third embodiments).

The control section 210 may use the two active TCI states for respective BFDs for two transmission/reception points (third embodiment).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (two or more physically or logically separate apparatus), for example, via wire, wireless, or the like and using these plurality of pieces of apparatus (these plurality of apparatus). The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 9:
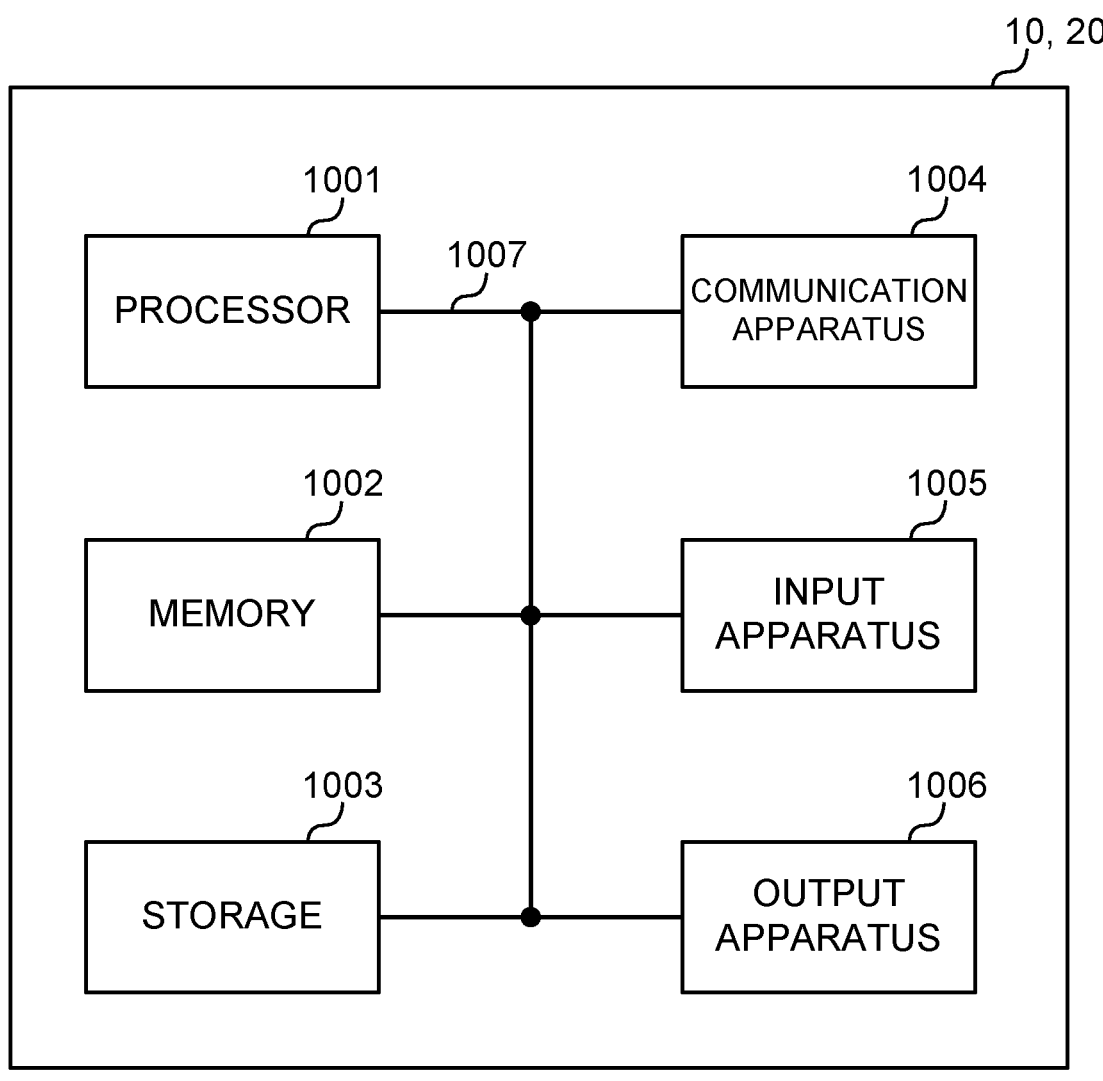
FIG. 9 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 9 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAN), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus (between apparatus).

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware (these hardware).

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink," "downlink," and the like may be interpreted as the words corresponding to the terminal-to-terminal communication (for example, "sidelink"). For example, an uplink channel, a downlink channel, and the like may be interpreted as a sidelink channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), 6th generation mobile communication system (6G), xth generation mobile communication system (xG) (xG (where x is, for example, an integer or a decimal)), Future Radio Access (FRA), New-Radio Access Technology (PAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

The invention claimed is:

1. A terminal comprising:
a transmitter that transmits capability information indicating support of an indication of two transmission configuration indicator (TCI) states for one control resource set (CORESET);
a receiver that receives, for a single frequency network (SFN) scheme, a medium access control-control element (MAC CE) indicating two TCI states for one CORESET; and
a processor that, when a failure detection resource is not provided, uses reference signals in the two TCI states indicated by the MAC CE for beam failure detection (BFD),
wherein the transmitter further transmits a second capability information indicating a maximum number of beam failure detection reference signals (BFD-RSs), wherein the BFD-RSs are determined based on an active TCI state for a CORESET for physical downlink control channel (PDCCH) monitoring, and
wherein when the failure detection resource is not provided and a number of reference signals in multiple active TCI states for multiple CORESETs for PDCCH monitoring is greater than the maximum number, the processor uses, for BFD, a number of the reference signals equal to the maximum number.

2. The terminal according to claim 1, wherein the processor determines the number of the reference signals equal to the maximum number, based on monitoring periodicity of multiple search space sets associated with the multiple CORESETs.

3. A radio communication method for a terminal, comprising:
transmitting capability information indicating support of an indication of two transmission configuration indicator (TCI) states for one control resource set (CORESET);
receiving, for a single frequency network (SFN) scheme, a medium access control-control element (MAC CE) indicating two TCI states for one CORESET;
using, when a failure detection resource is not provided, reference signals in the two TCI states indicated by the MAC CE for beam failure detection (BFD);
transmitting a second capability information indicating a maximum number of beam failure detection reference signals (BFD-RSs), wherein the BFD-RSs are determined based on an active TCI state for a CORESET for physical downlink control channel (PDCCH) monitoring; and
using, for BFD, when the failure detection resource is not provided and a number of reference signals in multiple active TCI states for multiple CORESETs for PDCCH monitoring is greater than the maximum number, a number of the reference signals equal to the maximum number.

4. A base station comprising:
a receiver that receives capability information indicating support of an indication of two transmission configuration indicator (TCI) states for one control resource set (CORESET);
a transmitter that transmits, for a single frequency network (SFN) scheme, a medium access control-control element (MAC CE) indicating two TCI states for one CORESET; and
a processor that, when not providing a failure detection resource, controls reception of a beam recovery request based on beam failure detection (BFD) using reference signals in the two TCI states indicated by the MAC CE, wherein the receiver further receives a second capability information indicating a maximum number of beam failure detection reference signals (BFD-RSs), wherein the BFD-RSs are determined based on an active TCI state for a CORESET for physical downlink control channel (PDCCH) monitoring, and wherein when the failure detection resource is not provided and a number of reference signals in multiple active TCI states for multiple CORESETs for PDCCH monitoring is greater than the maximum number, a number of the reference signals equal to the maximum number is used for BFD.

5. A system comprising a terminal and a base station, wherein the terminal comprises:

a transmitter that transmits capability information indicating support of an indication of two transmission configuration indicator (TCI) states for one control resource set (CORESET);

a receiver that receives, for a single frequency network (SFN) scheme, a medium access control-control element (MAC CE) indicating two TCI states for one CORESET; and a processor that, when a failure detection resource is not provided, uses reference signals in the two TCI states indicated by the MAC CE for beam failure detection (BFD), wherein the transmitter further transmits a second capability information indicating a maximum number of beam failure detection reference signals (BFD-RSs), wherein the BFD-RSs are determined based on an active TCI state for a CORESET for physical downlink control channel (PDCCH) monitoring, and wherein when the failure detection resource is not provided and a number of reference signals in multiple active TCI states for multiple CORESETs for PDCCH monitoring is greater than the maximum number, the processor uses, for BFD, a number of the reference signals equal to the maximum number, and the base station comprises:

a transmitter that transmits the MAC CE.

* * * * *